US009407770B2

(12) United States Patent
Martinez Perea et al.

(10) Patent No.: US 9,407,770 B2
(45) Date of Patent: Aug. 2, 2016

(54) MANAGING CALLS IN IMS NETWORKS

(71) Applicant: Vodafone IP Licensing Limited, Newbury, Berkshire (GB)

(72) Inventors: Rogelio Martinez Perea, London (GB); Rafael Dominguez Gonzalez, London (GB)

(73) Assignee: Vodafone IP Licensing Limited, Berkshire (GB)

( * ) Notice: Subject to any disclaimer, the term of this patent is extended or adjusted under 35 U.S.C. 154(b) by 0 days.

(21) Appl. No.: 14/332,596

(22) Filed: Jul. 16, 2014

(65) Prior Publication Data

US 2015/0036549 A1    Feb. 5, 2015

(30) Foreign Application Priority Data

Jul. 31, 2013   (ES) .................................. 201331179

(51) Int. Cl.
*H04L 12/66* (2006.01)
*H04M 3/54* (2006.01)
*H04M 7/00* (2006.01)
*H04L 29/06* (2006.01)

(52) U.S. Cl.
CPC ............. *H04M 3/54* (2013.01); *H04L 65/1016* (2013.01); *H04L 65/1063* (2013.01); *H04L 65/1096* (2013.01); *H04M 7/006* (2013.01)

(58) Field of Classification Search
CPC .... H04M 3/54; H04M 7/006; H04L 65/1016; H04L 65/1063; H04L 65/1096
See application file for complete search history.

(56) References Cited

U.S. PATENT DOCUMENTS

| 7,920,692 | B2 * | 4/2011 | Olshansky | H04M 3/42323 369/2 |
| 2007/0280464 | A1 * | 12/2007 | Hughes | H04M 7/003 379/205.01 |
| 2008/0304471 | A1 * | 12/2008 | Jackson | H04M 3/436 370/352 |
| 2009/0067439 | A1 * | 3/2009 | Yamamoto | H04L 63/061 370/400 |
| 2009/0164645 | A1 * | 6/2009 | Sylvain | H04L 65/1033 709/228 |
| 2012/0170733 | A1 * | 7/2012 | Chauvel | H04M 1/723 379/142.17 |
| 2012/0225652 | A1 * | 9/2012 | Martinez | H04M 3/42374 455/435.1 |
| 2013/0188786 | A1 * | 7/2013 | Kahn | H04M 3/543 379/142.01 |
| 2013/0208658 | A1 * | 8/2013 | Santos | H04W 76/02 370/328 |

FOREIGN PATENT DOCUMENTS

EP           2611255 A1     7/2013

OTHER PUBLICATIONS

Wikipedia. "Google Voice" <<http://en.wikipedia.org/wiki/Google_Voice>> visited Jul. 15, 2014, 12 pp.

* cited by examiner

*Primary Examiner* — Clemence Han
(74) *Attorney, Agent, or Firm* — Knobbe, Martens, Olson & Bear, LLP

(57) ABSTRACT

A method and system for managing calls in an IMS network, comprising a server and a device client communicated through an IP interface used for notifying, from the device client to the server, a decision selected by a user for managing an incoming call in a destination device where the device client runs. The server is where the network logic resides, interfacing with the IMS network via an ISC interface and with the device client via a Web Service or HTTP interface. The device client is where the user's decision logic resides as it comprises a user interface that provides the user with a set of available decisions for managing the incoming calls. The server, once notified on the decision selected by the user, releases the destination device from the call and takes an action based on said decision.

13 Claims, 2 Drawing Sheets

MANAGING CALLS IN IMS NETWORKS

TECHNICAL FIELD

This application is related to the telecommunications sector and, especially, relates to IMS network entities and services. More particularly, the system described herein deals with the industrial area engaged in providing a call management method and system using IMS facilities, and an IP-enabled user terminal.

BACKGROUND OF THE INVENTION

The Internet Protocol (IP) Multimedia Subsystem or IP Multimedia Core Network Subsystem (IMS) is an architectural framework for delivering IP multimedia services, including Voice over IP (VoIP), video calls, etc. IMS provides services for any type of IP communication whether it is voice or video telephony, video streaming, instant and multimedia messaging, multimedia gaming or virtual-reality.

In IMS, the Media Resource Function (MRF) provides media related functions such as media manipulation (e.g. voice stream mixing) and playing of tones and announcements. In IMS, the Home Subscriber Server (HSS) contains subscription-related information, performs authentication and authorization of the user, and can provide information about the subscriber's location and IP information, playing a role similar to the GSM Home Location Register (HLR) and Authentication Centre of the 3G/2G mobile network. The HSS is a centralized database for IMS, Packet Switched (PS) and Circuit Switched (CS) entities.

In mobile networks, apart from answering and rejecting a call, incoming call management capabilities provided by mobile network operators tend to be limited to a pre-defined configuration that applies to every incoming call. This pre-defined call management configuration results in diverting all incoming calls to a specific alternative number (e.g., voice-mail) when engaged, or when a call goes unanswered.

Current solutions providing additional incoming call management capabilities fall into the following two categories: device-based and call-forwarding.

Device-based solutions consist of an application residing on the user's handset that is notified by all incoming calls. The user is provided with prompts for how to handle the call. Examples include the Reject++ app for Android, or the calling functionality built into Apple iOS 6 that allows the user to decline any incoming call by replying automatic and instantly with a text message or setting a callback reminder, among other options. But these device applications need to maintain the connection between the caller and the service via the incoming call (i.e. they cannot disconnect or reject the call). This means that even if the phone does not have an active call, for a network perspective, the caller will be busy. Therefore, any actions that require the caller to remain connected (e.g., to receive an automated audio message or announcement) requires the call recipient to be unavailable (i.e., future incoming calls will receive the busy signal and the network will identify the caller status as busy). Also as the connection must be made directly to the device, roaming charges will apply only when the device is off-network. Therefore, the caller user does not have real time feedback of a call being rejected.

Call-forwarding solutions utilise the standard network call forwarding capabilities to forward every call to a third party service that then provides further capabilities (usually in conjunction with an application on the phone). Examples include HulloMail and Google Voice. As these applications require the forwarding capabilities of the network, they may result in slower response times (while the call is forwarded, followed by the action be requested and then executed). As users have the ability to change call forwarding settings for their account, they cannot realize the impact to any such call-forwarding service already configured. Another limitation is that call-forwarding solutions cannot work in roaming scenarios, since only the home network may know how to route the call.

There is therefore a need for providing users with the ability to manage incoming calls on a per-call basis, even in roaming network scenarios, as well as providing user devices with more variety of call management related capabilities which allow the user to decide per call basis what to do with the incoming call (e.g., automatic reply by sending a Short Message Service (SMS) to the caller) but without requiring previous configuration of the device by the user.

SUMMARY OF THE INVENTION

The system described herein serves to solve the aforesaid problem by providing a call management component integrated into the mobile network infrastructure, the network component having interaction with an application at the called party (the a running in a user device which is the call recipient) and that can handle incoming calls on behalf of a user.

The proposed network component is in charge of monitoring all the incoming calls (by using existing network monitoring techniques) to the final (called) user device, letting the call reach the final destination. In the destination (called party), there can be an application running in the user device that wakes up (by using existing device application capabilities) upon receiving the call. The application in the user device lets the user to decide what to do with the call, for instance, to send the call to the Voicemail, block the call, send the call to a predefined destination, play an announcement, put the calling party in a black list, etc. Once decided by the user what to do with the call, the application in the user device sends the user's decision (e.g., via Hypertext Transfer Protocol (HTTP)) to the network component which is monitoring the call and, depending on the decision, the network component either releases the call from the user device and sends it to the decided destination (e.g., Voicemail, predefined destination number, etc.) or the call is directly rejected by the network component (based on the user's decision or rule).

The system described herein is applicable to Circuit Switching (CS) voice calls and VoIP.

In a particular embodiment, the proposed call management can be implemented using IMS network architecture in a server-client basis, wherein an application server in the network and a device client at the user end, both connected by an IP interface (e.g., based on web service or HTTP post messages), are involved:

Application Server (AS), where the network logic resides, interfacing with the IMS network via IMS Service Control (ISC interface) and with the device client via a Web Service or HTTP Post interface.

Device Client, where the decision logic made by the user resides, interfacing via Web Service or HTTP Post to the Application Server and running in a user's terminal device.

The majority of the calls in a mobile telecommunication network typically start as a CS call. As part of the terminating services in which the AS operates, the call may be broken into IMS and Session Initiation Protocol (SIP) to be sent to the Application Server. The AS generally takes a decision about whether to direct the call to the CS network or to continue in the SIP domain. The Application Server can handle both situations in a straightforward manner and may work in the same way regardless of the technology used by the originating party (that is, either CS or VoIP).

In a particular embodiment, Device Clients of one or more users can use advice messages for communication between them. For example, a first user which has a second user in a blacklist of the first user's terminal device, but if the second user's terminal device has the proposed Device Client, the second user can use it to send an advice message such as: "Hey, please pick up the call, it's really important".

An aspect of the system described herein refers to a method for managing incoming calls to a user in IMS networks, which comprises the steps of:

notifying the Application Server that a user subscribed to its service is a destination of a CS call, the notification and identification of the destination device coming from the IMS network through the ISC interface;

providing the user with a set of decisions for managing calls once the CS call reaches the user's destination device, the set of decisions being provided by a Device Client running in the destination device to enable the user to select one or more decisions;

if a decision (or more than one, if there are compatible decisions available) is selected by the user, the Device Client communicates the selected decision to the Application Server through an IP interface and, based on the selected decision, the Application Server takes one or more actions corresponding to the user's decision/selection;

releasing by the Application Server the destination device from the CS call before taking the action/s.

Another aspect of the system described herein deals with a network entity for managing incoming calls to a user, the network entity being a server connectable to an IMS network and comprising a processing device for performing the steps of the Application Server in the method described before.

Another aspect of the system described herein deals with an IP-enabled terminal device of a user for managing incoming calls, which comprises a Device Client which provides the user's decision selected from a set of decisions for managing calls and communicates the selection via IP interface to an Application Server, which releases the destination device from the incoming call and then takes the corresponding action/s based on the communicated decision, as described in the method before.

And another aspect of the system described herein deals with a system for managing incoming calls to a user which comprises at least one server and at least one terminal device of the user performing the method described before.

A further aspect of the system described herein refers to a computer program product which comprises program code to be loaded into a processing device of a server in order to execute the described method. Another further aspect of the system described herein refers to a computer program product which comprises program code to be loaded into a processing device of a IMS-enabled terminal device in order to execute the described method.

The method and system in accordance with the above described aspects of the system described herein have a number of advantages with respect to prior art, summarized as follows:

Not needing to connect incoming calls to the recipient device (at the called party) and, hence, avoiding roaming charges and allowing simultaneous inbound/outbound calls).

Not using call forwarding also avoids roaming charges and reduces waiting time and user configuration errors, since the call is not connected although the action decision is made at the user's terminal.

The system described herein is a benefit to the mobile network operator in terms of efficiency of resources, since the proposed call management is based on network capability, not device-based.

Regarding device-based solutions, the main difference is that the system described herein only relies on device actions in order to tell the network what action it should take. Thus, the system described herein allows the network provider to maintain its services (call completion, billing, roaming services, etc.), unlike existing applications which are based only on device actions but they do not take into account network services/capabilities.

DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

An embodiment of the system described herein is focused on a system for managing incoming calls to a user subscribed to services using IMS networks.

Figure 1:
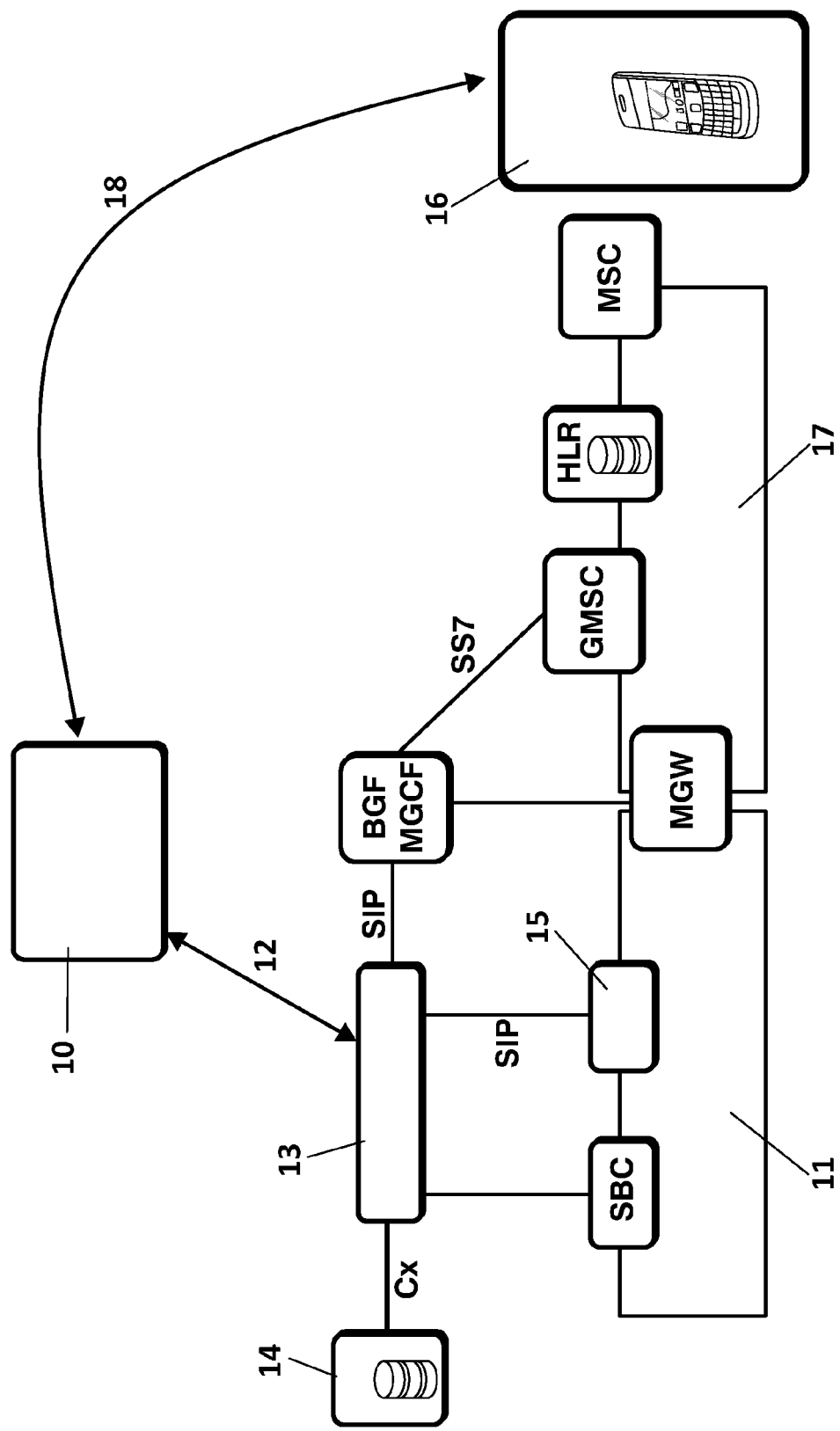
FIG. 1 shows a block diagram of the system architecture for call management using IMS networks, according to an embodiment of the system described herein.

FIG. 1 shows a possible architecture implementation of the system. IMS network (11) and CS network (17) are connected through the Media gateway (MGW) and the Media Gateway Control Function (MGCF), which communicates with the Call Session Control Function (CSCF) in the IMS network (11) and the Gateway Mobile Switching Centre (GMSC) in the CS network (17). A server (10), connected to a Proxy, Interrogating or Serving CSCF (13), receives a trigger from the IMS network (11) via the ISC interface (12), when the connected CSCF (13) is notified that a user (16) subscribed to the server (10) is the destination of a CS call. The trigger uses Public Service Identities, PSI, which are stored in the HSS (14) and determined by a prefix that is used to route the CS call into the IMS network (11). The server (10) checks the P-Asserted-Identity, PAI, which is a header field used on the SIP Private Networking interface to carry identity information, in order to identify the calling party. If the calling party is in a barring list, the server (10) just sends either a "480 Temporarily Unavailable" SIP message back or resends the call to a MRF (15) in order to play a predefined announcement. Otherwise, if the calling party is not in a barring list, then the server (10) lets the call continue just changing the PSI by a breakout prefix, in order to reach the destination user (16) in the CS network (17). A breakout prefix is a prefix to be added to the SIP request URI, which indicates to the CSCF (13) the action to be taken, overriding any previous configured action in the CSCF (13), for example, actions configured by the Service Profile in the HSS (14) defining the service trigger for a collection of Public User Identities, PUI. In the case that the call is for a VoIP user, no breakout prefix is to be added and the call proceeds normally via CSCF (13). The server (10) also stores information related to the call, comprising the identities of Calling party and Called party, to match future decisions of the user. The CS call is branched into several legs to alert several termination addresses simultaneously. By default, a leg to be answered is connected to the Calling party and another leg is the destination user (16) at the called party. Once the call is received by the destination user (16), a device client is popup, upon a dial alert event, providing the user with a set of available decisions:

- If the destination user (16) answers the call, the server (10) receives a 200OK message and no further decision is expected by the device client. The server (10) sends 200OK message back to the originator user at the calling party.
- If the destination user (16) rejects the call, the server (10) receives a SIP response 486 "Busy Here" and the call signalling, including this SIP response, is sent back to the calling party.
- If the destination user (16) chooses one of the available decisions from the set provided by the server (10), while ringing the call, the server (10) receives an indication of the chosen decision via IP interface (18) from the destination user (16) and, depending on the chosen decision, takes an action comprising the cancellation of the leg associated with the destination user (16) and the creation of a new leg:
  - If the decision is "sending a DictaSMS", the server (10) cancels the leg associated with the destination user (16) and creates a new leg adding the DictaSMS prefix to the user number.
  - If the decision is "forwarding to voicemail", the server (10) cancels the leg associated with the destination user (16) and creates a new leg adding the voicemail prefix to the user number.
  - If the decision is "blocking the call", the server (10) cancels the leg associated with the destination user (16) and creates a new leg implementing the connection to the MRF (15) in order to play a blocking announcement.
  - If the decision is "playing a personalized announcement", the server (10) cancels the leg associated with the destination user (16) and creates a new leg implementing the connection to the MRF (15) in order to play the personalized announcement.
  - If the decision is "put in a black list", the server (10) cancels the leg associated with the destination user (16) and creates a new leg implementing the connection to the MRF (15) in order to play a blocking announcement and, in addition, in parallel, the server (10) includes the calling party in a barring list.

The user (16) of the destination device, called party, can have the proposed call management service configured in CS domain and IMS domain. In CS domain, the called party has a terminating service (e.g., based on an ETICK, which is a HLR parameter that allows the call to be routed to an specific Service or endpoint, the terminating service to be applied to the subscriber can be defined by a customized etick, predefined by the operator in the network, for routing the call into IMS via the Media Server—MS—). In IMS domain, the server (10) is part of the service profile for the user (16) defined in HSS (14). The service is applied always in IMS domain, but the service requires to be configured in the CS domain too, so that the calls can be routed to IMS domain. IMS and CS domain are linked via Media Server or Media Gateway, MS or MGW, as known.

In order to avoid a bad user experience when the destination is not connected to data network, the device client can detect this situation by standard procedure implemented in the mobile terminal of the destination user (16) in order to offer only "send SMS" option upon an incoming call. For example, Android offers several detection procedures to know this situation, one of them is to register to an specific Operating System service.

Figure 2:
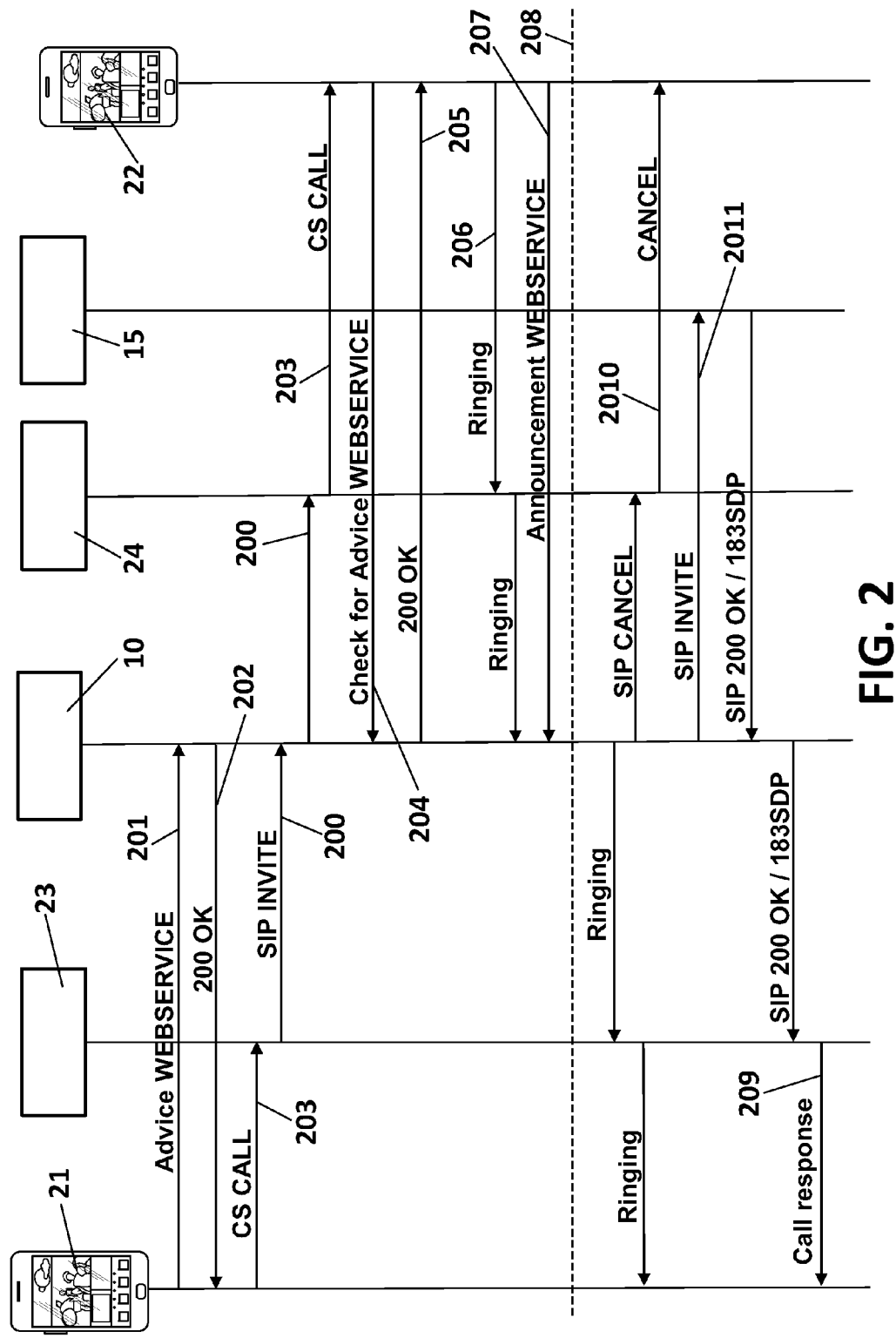
FIG. 2 shows a flow diagram of messages in the system of the previous figure, according to an embodiment of the system described herein.

FIG. 2 shows a message sequence chart of an example for the system playing described before in the case that the chosen decision is "playing a personalized announcement" and the calling and called parties are regular CS clients. The calling or originator device (21) is connected to an originating media gateway (23) and the called or destination device (22) is connected to a destination media gateway (24). In this case, both the originator device (21) and the destination device (22) have a device client. The device clients are communicated with the server (10) through a web service interface or a service defined by XML over HTTP interface, depending on the capabilities of the originator device (21) and the destination device (22).

1—When the originator device (21) wants to initiate a call to a destination device (22), which is initiated by sending a CS Call establishment message (203) to the originating media gateway (23), the device client running in the originator device (21) selects an advice message to inform on the reason of the call (201) and sent it to the server (10), e.g., via a web service interface, the advice message including the address of the originator device (21) and the address of destination device (22).

2—The server (10) stores this information, advice message and addresses, until the call is established. Afterwards, once the CS Call response message (209) is received by the originator device (21), the server (10) can delete the advice message.

3—As long as the device client running in the originator device (21) receives the confirmation (202) from the server (10), the call to the destination is initiated by the device client running in the originator device (21), which sends the CS Call establishment message (203).

4—The call follows the normal voice call flow from the originator device (21) to the destination device (22): the call setup message is received by the originating media gateway (23), which then sends a SIP INVITE message (200) to the destination media gateway (24).

5—When the call from the originator is received by the destination, i.e., the CS Call establishment message (203) reaches the destination device (22) from the destination media gateway (24), the device client running in the destination device (22) checks (204) if there is advice message in the server (10) for the call to be presented. If so (205), the destination user can see the advice message using a user interface of the device client in the destination device (22), displayed at ringing time (206). In parallel, the device client running in the destination device (22) provides the user with the set of available decisions and the destination user selects the action to perform, for instance, the action "play a personalized announcement" (207), as explained above.

6—The server (10) releases the call from the destination media gateway (24) and destination device (22) sending SIP CANCEL (2010). The server (10) orders (2011) the MRF (15) to play the personalized announcement. And, in parallel, the call goes on the normal voice call flow (208) to the originator device (21).

The web service interface, or XML over HTTP Post interface, between the server (10) and the device client of the originator device (21) or the destination device (22), supports the following messages:

1—Action Requested message, which indicates the action associated with the decision chosen in the device client to be performed by the server (10). The parameters of the Action Requested message are:
  a. Calling Party.
  b. Called Party.
  c. Action, with one or more of the following values selected from: send to the voicemail, block the call, play an announcement or put in a black list, remove from the blacklist, retrieve blacklist, record announcement, check list of announcements, remove announcements.
  d. File, for announcement management.
2—Advice Message, which is sent by the device client running in the originator device (21):
  The parameters of the Advice Message are:
  a. Calling Party.
  b. Called Party.
  c. Identification of the advice message.
3—Retrieve Advice Message, which is sent by the device client running in the destination device (22) and whose parameters are:
  a. Calling Party.
  b. Called Party.

The device client in the destination device (22) has to capture an incoming call. Initially the device client has to be 'sleeping' and incoming calls make the device client to come up to the foreground so that the destination user is shown the different options available to handle the call. It is important to highlight that the most critical point here for the user experience is the speed in this sequence, because the customer needs time to decide which option to take before the calling party decides to give up the call. For this purpose, the device client comprises the following functionalities which can be displayed by a user interface:

1. Incoming call management: when a call is received in the destination device (22), the following information is displayed:
    The calling number.
    Contact picture if available in the agenda.
    Icons for the options available.
      Answer
      Reject
      Sent to Dicta SMS
      Send to the voicemail.
      Block the call.
      Play an announcement
        For this one, a submenu can be displayed in other to choose the announcement from the list.
      Put in a black list.
      Send predefined SMS.
        For this one, a submenu can be displayed in other to choose the SMS from the list.
2. Configuration management:
   a. Announcements:
     i. View list of predefined announcements.
     ii. Listen to specific predefine announcement.
     iii. Record new announcement.
   b. SMS:
     i. View list of predefined SMSs.
     ii. Read specific predefined SMS.
     iii. Define new SMS.
   c. Black list:
     i. View Blacklisted phone numbers.
     ii. Add number to blacklist (from agenda, received calls, missed calls . . . )
     iii. Remove number from black list.
   d. Advice Message:
     i. View list of predefined Messages.
     ii. Read specific predefined Message.
     iii. Define new Message.
3. Call history:
   a. List of calls received should be displayed, indicating the action taken in each case (answer, reject, etc.).
   b. From each line it should be possible to call back this phone numbers.
   c. For the calls which action taken was to add to the blacklist it should be possible to undo and remove them from the blacklist.
   d. For calls which action taken was to play an announcement it should be possible to listen to the announcement.
   e. For calls which action taken was to send an SMS it should be possible to read the SMS sent.

Note that in this text, the term "comprises" and its derivations (such as "comprising", etc.) should not be understood in an excluding sense, that is, these terms should not be interpreted as excluding the possibility that what is described and defined may include further elements, steps, etc.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of aspects of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method for managing calls in an Internet Protocol (IP) Multimedia Subsystem (IMS) network, the method comprising:
   receiving a notification by a server from the IMS network that a user subscribed to the server is identified as a destination device of a call;
   identifying by the server an originator device originating the call;
   receiving an advice message by the server from the originating device when originating the call, the advice message informing on a reason of the call to the server;

in response to establishing the call at the destination device, transmitting the advice message by the server to the destination device before the destination device selects one or more decisions from a set of decisions;

receiving by the server at least one decision selected from the set of decisions; and releasing the destination device from the call before taking an action by the server based on the selected decision.

2. The method according to claim 1, further comprising:
in response to establishing the call at the destination device, sending a reply message to the originator device from the server.

3. The method according to claim 2, wherein the reply message is at least one of: a call response in the case that the user answers the call; a call rejection in the cases that the user or the server rejects the call; or a ringing message in any other case.

4. The method according to claim 2, further comprising:
storing data related to the call in the server, the data comprising an identifier of the originator device and an identifier of the destination device.

5. The method according to claim 1, further comprising:
providing the set of decisions for managing calls to the destination device, from which the destination device selects the at least one decision, once the call reaches the destination device,
wherein the server receives the selected decision from the destination device while ringing the call.

6. The method according to claim 1, wherein the action taken by the server is at least one of: sending a Short Message Service (SMS); sending the call to a voicemail; blocking the call; putting a user identifier in a black list; removing a user, identifier from a blacklist; retrieving a blacklist; playing an, announcement; storing an announcement; checking a list of announcements; editing an announcement; or removing an announcement.

7. The method according to claim 1, wherein the call is a circuit switched (CS) call or a Voice over IP (VoIP) call.

8. A server for managing calls in an Internet Protocol (IP) Multimedia Subsystem (IMS) network, comprising:
a processor configured to identify an originator device originating a call;
an IMS Service Control (ISC) transceiver circuit interfacing with the IMS network configured to:
receive an identification notification when a user subscribed to the server is identified as a destination device of the call, and
receive an advice message from the originating device when originating the call, the advice message informing on a reason of the call; and
an IP transceiver circuit configured to:
in response to establishing the call at the destination device, transmit the advice message to the destination device before the destination device selects one or more decisions from a set of decisions;
receive decision notification from the destination device, the decision notification including at least one decision selected from the set of decisions for managing the call;
wherein the server is further configured to release the destination device from the call before taking an action based on the decision notification.

9. The server according to claim 8,
wherein the server is further configured to send a reply message to the originator device, once the call reaches the destination device.

10. The server according to claim 8, further comprising:
a data storage circuit configured to store data related to the call, the data comprising at least an identifier of the originator device and an identifier of the destination device.

11. A user terminal for managing calls in an Internet Protocol (IP) Multimedia Subsystem (IMS) network, comprising
a user interface circuit configured to receive a set of decisions for managing incoming calls from which the user terminal selects at least one decision, once a call reaches the user terminal when identified as a destination device of the call; and
an IP transceiver circuit configured to:
before the user terminal selects the at least one decision from the set of decisions, receive from a server an advice message sent to the server from an originating user terminal identified by the server as a originating device of the call, and
communicate the at least one decision selected by the user terminal to a server, for taking an action based on the communicated decision.

12. A system for managing calls in Internet Protocol (IP) Multimedia Subsystem (IMS) networks, comprising:
a server;
a user terminal; and
at least one IP interface circuit;
the server including:
a processor configured to identify an originator device originating a call;
an IMS Service Control (ISC) transceiver circuit interfacing with the IMS network configured to receive an identification notification when the user terminal is identified as subscribed to the server and as a destination device of the call, the ISC transceiver circuit further configured to receive an advice message from the originating device when originating the call, the advice message informing on a reason of the call, wherein the at least one IP interface circuit is configured to, in response to establishing the call at the user terminal, transmit the advice message to the user terminal before the user terminal selects at least one decision from a set of decisions, and the at least one IP interface circuit further configured to receiver a decision notification from the user terminal, the decision notification including at least one decision selected by the user terminal from the set of decisions for managing the call, and wherein the server is further configured to release the user terminal from the call before taking an action based on the decision notification; and
the user terminal including:
a user interface circuit configured to receive the set of decisions for managing incoming calls from which the user terminal selects the at least one decision, once the call reaches the user terminal when identified as the destination device of the call, wherein the at least one IP interface circuit is configured to, before the user terminal selects the at least one decision from the set of decisions, receive from the server the advice message, and the at least one IP interface circuit further configured to communicate the at least one decision selected by the user terminal to the server, for taking an action based on the communicated decision,
wherein the user terminal and the server are configured to communicate through the at least one IP interface circuit.

13. The system, according to claim 12, wherein the at least one IP interface is a web service interface or a Hypertext Transfer Protocol (HTTP) interface.

* * * * *